United States Patent
Black et al.

(10) Patent No.: US 12,465,859 B2
(45) Date of Patent: Nov. 11, 2025

(54) SYSTEMS AND METHODS FOR ARTIFICIAL INTELLIGENCE (AI)-ASSISTED TEMPORAL CONTEXT PROCESSING IN SUPPORT OF HAND-GESTURE COMMUNICATION IN VIDEO GAMING

(71) Applicant: Sony Interactive Entertainment Inc., Tokyo (JP)

(72) Inventors: Glenn Black, San Mateo, CA (US); Jeffrey Stafford, San Mateo, CA (US); Andrew Young, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 221 days.

(21) Appl. No.: 18/314,479

(22) Filed: May 9, 2023

(65) Prior Publication Data

US 2024/0375011 A1 Nov. 14, 2024

(51) Int. Cl.
*A63F 13/67* (2014.01)
*A63F 13/87* (2014.01)
(Continued)

(52) U.S. Cl.
CPC ............... *A63F 13/67* (2014.09); *A63F 13/87* (2014.09); *G06V 10/70* (2022.01); *G06V 20/41* (2022.01); *G06V 40/28* (2022.01)

(58) Field of Classification Search
None
See application file for complete search history.

(56) References Cited

U.S. PATENT DOCUMENTS 7,720,784 B1 * 5/2010 Froloff ............... G06F 40/20
600/300
7,785,197 B2 8/2010 Smith
(Continued)

FOREIGN PATENT DOCUMENTS

CN 106943740 A 7/2017
CN 113557069 A 10/2021
(Continued)

OTHER PUBLICATIONS

PCT Application No. PCT/US2024/026894, International Search Report and Written Opinion of the International Searching Authority, Mailed on Aug. 12, 2024, 12 pages.
(Continued)

*Primary Examiner* — Seng H Lim
(74) *Attorney, Agent, or Firm* — Fish & Richardson P.C.

(57) ABSTRACT

A hand-gesture tracking engine includes a first artificial intelligence (AI) model component configured and trained to automatically identify a hand-gesture made by a source player within a video game. A hand-gesture intent engine includes a second AI model component configured and trained to automatically determine a message for communication to a target player within the video game as conveyed by the hand-gesture identified by the hand-gesture tracking engine. A hand-gesture translation engine having a third AI model component configured and trained to automatically generate a communication to the target player that conveys the message as determined by the hand-gesture intent engine. The third AI model component is configured and trained to automatically control sending of the communication to the target player.

30 Claims, 5 Drawing Sheets

(51) Int. Cl.
*G06V 10/70* (2022.01)
*G06V 20/40* (2022.01)
*G06V 40/20* (2022.01)

(56) References Cited

U.S. PATENT DOCUMENTS

| | | | |
|---|---|---|---|
| 8,523,673 | B1 | 9/2013 | Boyd et al. |
| 8,751,215 | B2 | 6/2014 | Tardif |
| 9,009,747 | B2* | 4/2015 | Miller, IV ............. A63F 13/428 725/12 |
| 9,684,430 | B1 | 6/2017 | Perigault |
| 10,179,291 | B2 | 1/2019 | Thomas et al. |
| 10,290,176 | B2* | 5/2019 | Froy .................. G07F 17/3262 |
| 10,607,134 | B1 | 3/2020 | Cosic |
| 10,915,178 | B2* | 2/2021 | Iwanami ................. G06F 13/00 |
| 10,946,280 | B2 | 3/2021 | Kunieda |
| 11,126,266 | B1 | 9/2021 | Xiao et al. |
| 11,369,884 | B2 | 6/2022 | Niwa et al. |
| 11,402,917 | B2* | 8/2022 | Yokokawa .............. G06F 3/017 |
| 12,131,586 | B2 | 10/2024 | Carlock et al. |
| 2002/0178011 | A1 | 11/2002 | Yotoriyama et al. |
| 2007/0191097 | A1 | 8/2007 | Johnson |
| 2009/0217211 | A1* | 8/2009 | Hildreth .................. G06F 3/048 715/863 |
| 2010/0112530 | A1 | 5/2010 | Schoenbach |
| 2010/0199228 | A1 | 8/2010 | Latta et al. |
| 2011/0059801 | A1 | 3/2011 | Shigi et al. |
| 2011/0301934 | A1 | 12/2011 | Tardif |
| 2012/0054646 | A1 | 3/2012 | Hoomani et al. |
| 2013/0084978 | A1 | 4/2013 | Olomskiy |
| 2014/0046661 | A1 | 2/2014 | Bruner |
| 2014/0329208 | A1 | 11/2014 | Jones et al. |
| 2016/0005336 | A1 | 1/2016 | Peng et al. |
| 2016/0042228 | A1 | 2/2016 | Opalka et al. |
| 2016/0059120 | A1 | 3/2016 | Komorous-King et al. |
| 2017/0173455 | A1 | 6/2017 | Sheil et al. |
| 2018/0075659 | A1 | 3/2018 | Browy et al. |
| 2018/0161683 | A1 | 6/2018 | Thomas et al. |
| 2018/0188820 | A1* | 7/2018 | Zavesky ................ G06F 3/005 |
| 2018/0260577 | A1 | 9/2018 | Adams et al. |
| 2018/0314337 | A1* | 11/2018 | Iwanami ............... H04L 67/535 |
| 2018/0345128 | A1 | 12/2018 | Ahmed et al. |
| 2019/0038964 | A1 | 2/2019 | Veeramani et al. |
| 2019/0171716 | A1 | 6/2019 | Weber |
| 2019/0251344 | A1 | 8/2019 | Menefee et al. |
| 2019/0340426 | A1 | 11/2019 | Rangarajan et al. |
| 2019/0391662 | A1* | 12/2019 | Yokokawa .............. A63F 13/25 |
| 2020/0193714 | A1 | 6/2020 | Browy et al. |
| 2020/0258099 | A1 | 8/2020 | Alghamdi |
| 2020/0276497 | A1 | 9/2020 | Nietfeld et al. |
| 2020/0298131 | A1 | 9/2020 | Pinto et al. |
| 2020/0380793 | A1 | 12/2020 | Browy et al. |
| 2021/0146255 | A1 | 5/2021 | Taylor et al. |
| 2021/0339151 | A1* | 11/2021 | Stafford ................ A63F 13/655 |
| 2021/0390289 | A1 | 12/2021 | Yang et al. |
| 2022/0096937 | A1 | 3/2022 | Dorn et al. |
| 2022/0165013 | A1* | 5/2022 | Velez .................... A63F 13/213 |
| 2022/0171960 | A1 | 6/2022 | Nelson et al. |
| 2022/0188538 | A1 | 6/2022 | Vieira et al. |
| 2022/0236795 | A1* | 7/2022 | Jonker .................... G06F 3/011 |
| 2022/0327309 | A1 | 10/2022 | Carlock et al. |
| 2022/0343576 | A1 | 10/2022 | Marey et al. |
| 2022/0362680 | A1 | 11/2022 | Stafford et al. |
| 2023/0087879 | A1 | 3/2023 | An et al. |
| 2024/0335737 | A1 | 10/2024 | Bean et al. |
| 2024/0335740 | A1 | 10/2024 | Bean et al. |
| 2024/0367034 | A1 | 11/2024 | Tokubo et al. |
| 2024/0367055 | A1 | 11/2024 | Black et al. |

FOREIGN PATENT DOCUMENTS

| | | |
|---|---|---|
| EP | 3979050 A1 | 4/2022 |
| JP | 2011-212296 A | 10/2011 |
| JP | 2013-135761 A | 7/2013 |
| JP | 2020-031903 A | 3/2020 |
| JP | 2020-065656 A | 4/2020 |
| JP | 2020-513960 A | 5/2020 |
| JP | 2020-177438 A | 10/2020 |
| JP | 2022-522402 A | 4/2022 |
| KR | 102304608 B1 | 9/2021 |
| WO | WO 2017081896 A1 | 5/2017 |
| WO | WO 2020176106 A1 | 9/2020 |

OTHER PUBLICATIONS

Uzma et al., "Advances in machine translation for sign language: approaches, limitations, and challenges," Neural Computing, London, May 18, 2021, 33(21):1-43.

wikipedia.org [online], "Emote," Jan. 11, 2023, retrieved on Mar. 19, 2025, retrieved from URL< https://en.wikipedia.Org/w/index.php?title=Emote&oldid=1132929070>, 2 pages.

* cited by examiner

SYSTEMS AND METHODS FOR ARTIFICIAL INTELLIGENCE (AI)-ASSISTED TEMPORAL CONTEXT PROCESSING IN SUPPORT OF HAND-GESTURE COMMUNICATION IN VIDEO GAMING

BACKGROUND OF THE INVENTION

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations, particularly with regard to improving communication to players of the video game in order to provide for increased player engagement and enhanced player experience. It is within this context that implementations of the present disclosure arise.

SUMMARY OF THE INVENTION

In an example embodiment, a system is disclosed for supporting hand-gesture-based communication to a player of a video game. The system includes a hand-gesture tracking engine that has a first artificial intelligence (AI) model component that is configured and trained to automatically identify a hand-gesture made by a source player. The system also includes a hand-gesture intent engine that has a second AI model component that is configured and trained to automatically determine a message for communication to a target player as conveyed by the hand-gesture identified by the hand-gesture tracking engine. The system also includes a hand-gesture translation engine that has a third AI model component that is configured and trained to automatically generate a communication to the target player that conveys the message as determined by the hand-gesture intent engine. The third AI model component is also configured and trained to automatically control sending of the communication to the target player.

In an example embodiment, a method is disclosed for supporting hand-gesture-based communication to a player of a video game. The method includes automatically identifying a hand-gesture made by a source player through execution of a first AI model component. The method also includes automatically determining a message for communication to a target player as conveyed by the hand-gesture through execution of a second AI model component. The method also includes automatically generating a communication to the target player that conveys the message through execution of a third AI model component. The method also includes automatically controlling sending of the communication to the target player through execution of the third AI model component.

DETAILED DESCRIPTION OF THE INVENTION

Figure 1A:
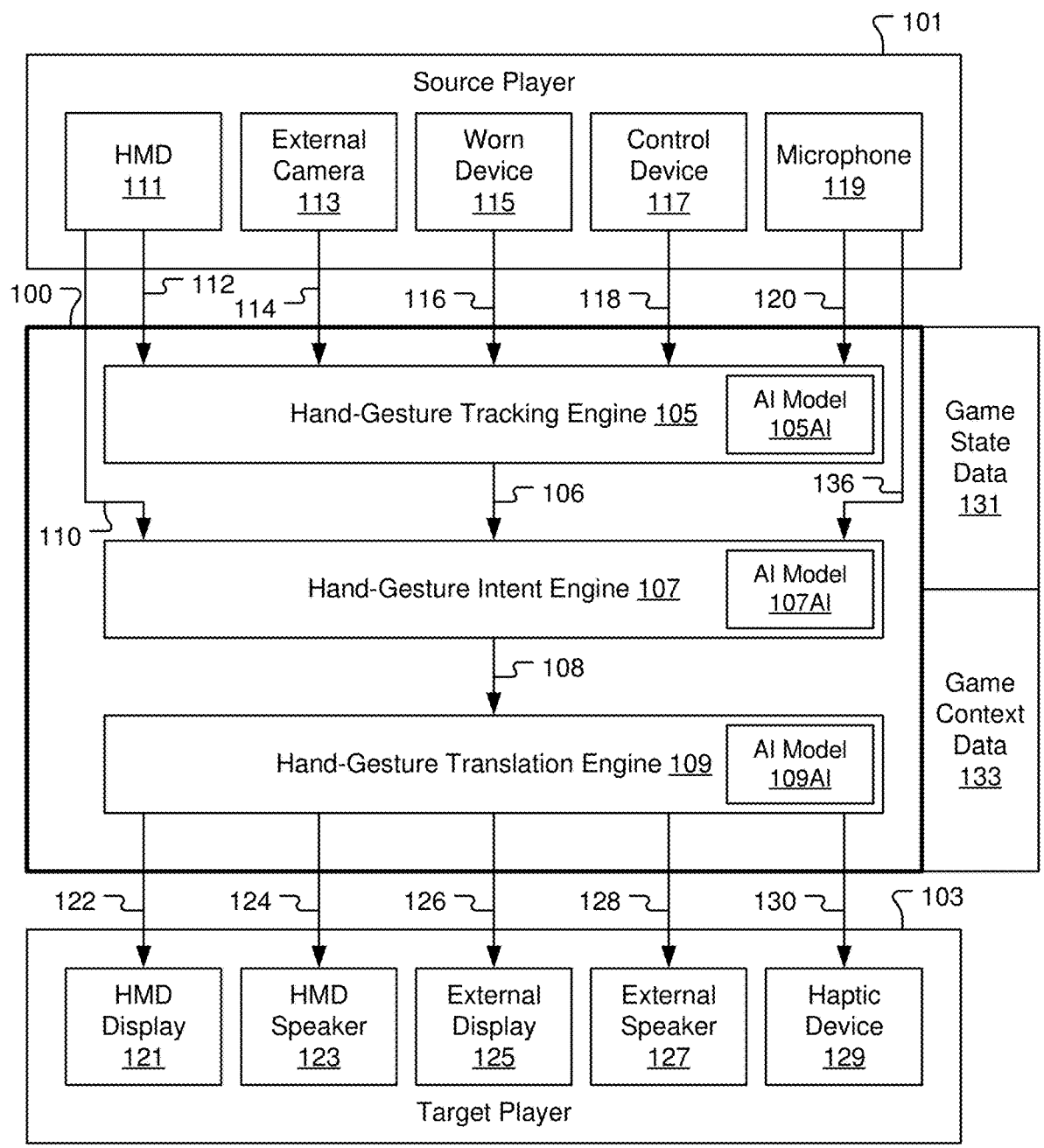
FIG. 1A shows a diagram of a system for supporting hand-gesture-based communication to a player of a video game, in accordance with some embodiments.

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Many modern computer applications, such as video games, virtual reality applications, augmented reality applications, virtual world applications, etc., provide for various forms of communication to users of the computer applications. For ease of description, the term "video game" as used herein refers to any of the above-mentioned types of computer applications that provide for user participation in the execution of the computer application. Also, for ease of description, the term "player" (as in video game player) as used herein refers to a user that participates in the execution of any of the above-mentioned types of computer applications.

In various embodiments, in-game communications are made between different players of the video game, and/or between spectators of the video game and players of the video game, and/or between virtual entities (e.g., video game-generated entities) and players of the video game. In various embodiments, communications that are conveyed to players within the video game can have one or more of a textual format, an image format, a video format, an audio format, and a haptic format, among essentially any other format that can be implemented within the video game. In various embodiments, the content of a communication made within the video game is one or more of a gesture (made either by a real human body or a virtual entity within the video game), a spoken language statement/phrase (made either audibly or in written form), and a video game controller input. In various embodiments, the video game controller can be any type of device used to convey any type of user input to a computer system executing the video game. For example, in various embodiments, the video game controller is one or more of a hand-held video game controller, a head-mounted display (HMD) device, a sensor-embedded wearable device (e.g., glove, glasses, vest, shirt, pants, cape, hat, etc.), and a wielded control device (e.g., wand, club, gun, bow and arrow, sword, knife, bat, racket, shield, etc.). In some embodiments, the video game controller is a hand-held extended reality (XR) controller, such as the PlayStation™ VR2 Sense Controller, among others. In various embodiments, the XR controller is one or more of an augmented reality (AR) controller, a virtual reality (VR) controller, and a mixed reality (MR) controller. In some embodiments, the XR controller is configured to include button controls, a stick control, a trigger control, a gyroscope and three-axis accelerometer for six-axis motion sensing, one or more sensors for finger touch/position/movement detection, and/or an infrared tracking light emitter for infrared position tracking of the controller. In some embodiments, the hand-held XR controller is configured to be tracked by devices and sensors within an associated HMD.

In various embodiments, communications are made to players of the video game within the context of the video game, such that the communications are conveyed in a form that is commensurate with the game state and game context of the video game. For example, if a target player of a video game is shown a heads-up display as part of their normal play of the video game, then a player-to-player communication may be conveyed as an image and/or textual message within the heads-up display of the target player. For ease of description, the term "target player" as used herein refers to a player of the video game to whom a message is directed, regardless of the source of the message. Also, for ease of description, the term "source player" as used herein refers to the entity (e.g., another player or spectator of the video game or a computer-generated virtual entity within the video game) that originates the message that is to be conveyed to the target player. In various embodiments, the source player is one or more of a player of the video game, a spectator of the video game, a computer-generated entity (e.g., avatar, object, etc.) within the video game, among essentially any other entity that may be present within or interfaced to an environment/context of the video game, where the source player is permitted by the rules of the video game to engage in communication with the target player.

Many modern video games provide for gesture-based communication to enhance the game play experience of players. In particular, many video games are implemented to provide for use of "hand-gestures" to convey messages from the source player to the target player within the video game context. The term "hand-gesture" as used herein refers to a positioning and/or movement of any one or more of a hand, a wrist, a set of fingers (e.g., the fingers on one hand), and an arm of the source player to convey a message to the target player. Also, the term "hand-gesture" encompasses a gesture made using any one or more of two hands, two wrists, two sets of fingers (e.g., the fingers on each of two hands), and two arms of the source player to convey a message to the target player. In some embodiments, hand-gestured messages are made in an arbitrary manner that is meaningful within a particular video game context, but that does not necessarily follow a standardized format. In other embodiments, hand-gestured messages are made in a manner that is meaningful within a particular video game context and that follows a standardized format. For example, in some video games, hand-gestured messages may be interpreted against a set of tactical hand signals associated with the context of the video game. Also, in some embodiments, hand-gestured messages take the form of formal/standardized sign language, such as American Sign Language, that is also meaningful to the context of the video game.

In various embodiments, video games are equipped to utilize various devices to capture and detect hand-gestures made by source players. For example, in some embodiments, the video game utilizes one or more cameras to capture video of the source player's hands and arms, such that the video can be analyzed to detect when a hand-gesture is being made by the source player. In some embodiments, the one or more cameras are positioned away from the source player such that the source player is positioned within a field of view of the one or more cameras. In some embodiments, the source player wears an HMD that includes one or more HMD-mounted cameras that are positioned and oriented such that the arms and hands of the source player are within a field of view of the one or more HMD-mounted cameras. Also, in some embodiments, hand-gestures are detected by a sensor-embedded device worn by the source player. For example, in some embodiments, the source player wears a glove that includes sensors configured to detect a position, orientation, and movement of one or more of the hand, wrist, and set of fingers of the source player. Also, in some embodiments, the source player wears two such sensor-embedded gloves. It should be understood that the term "glove" is used herein to mean essentially any type, form, or shape of article that is affixed to a hand of the source player. Also, in some embodiments, the source player wears a glove that includes reflectors and/or lights to assist with visual analysis of the source player's hands to determine when and what hand-gestures are being made by the source player. In some embodiments, the source player holds a hand-held XR controller or a pair of hand-held XR controllers (one in each hand), where the hand-held XR controller is described above.

In some embodiments, play of the video game involves rapid changes in game state and/or game context, which can pose challenges for timely processing and conveyance of hand-gestured messages from the source player to the target player. In some embodiments, the meaning of a particular hand-gesture is dependent on the game state and game context that exists when the particular hand-gesture is made. For example, a source player giving a hand-gestured message by waiving to a target player in a particular video game context in which the source player and the target player are at a baseball game during the seventh inning stretch can have a significantly different meaning than the source player giving the same hand-gestured message by waiving to the target player in a temporally different video game context where a foul ball has been hit toward the target player's position in the stands. Because the game state and game context can change abruptly and/or rapidly within video games, various embodiments are disclosed herein for the processing (e.g., detecting, interpreting, and delivering) of a hand-gestured message by considering the game state and game context within a temporally moving window of time that just precedes the time when the hand-gestured message is made and detected. In this manner, the systems and methods disclosed herein mitigate the potential for incorrect processing of hand-gestured messages because of stale/old game state data and game context data that is not applicable to the hand-gestured message and that may lead to an incorrect interpretation of the hand-gestured message.

Also, in some embodiments, the video game system may need to identify and translate the hand-gestured message into a verbal communication that can be conveyed to the target player. With conventional linear procedural processing techniques, the procedures for identifying and translating the hand-gestured message, and ultimately conveying the verbal communication to the target player can take a significant amount of time relative to a rate at which the game state and/or game context is changing during execution of the video game, such that when the verbal communication is received by the target player, the verbal communication may no longer be relevant to the current game state and/or game context associated with the target player, which could lead to confusion and/or aggravation of the target player, and possibly adversely affect the target player's playing of the video game. For example, if a target player were moving through a labyrinth in a video game where a first upcoming right turn leads to the exit, but a second upcoming right turn leads to a bottomless pit, processing of a source player's hand-gestured message to "take a right turn" into a verbal communication to the target player to take the next right turn could lead to the target player falling into the bottomless pit if there is too much latency/delay in processing of hand-gestured message and generation/conveyance of the corresponding verbal communication to the target player. Therefore, because of latency/delay in processing of hand-gestured messages, some hand-gestured messages that may have been originally well-intended by the source player for the benefit of the target player may actually end up adversely affecting the target player. The systems and methods disclosed herein reduce latency/delay in processing of hand-gestured messages by implementing artificial intelligence (AI) model components to provide for faster detection of hand-gestured messages, faster interpretation of hand-gestured messages, and faster conveyance of communications to target players that originate from hand-gestured messages.

In various embodiments disclosed herein, if the video game system determines that the hand-gestured message will not make sense at the current point in the video game, based on the current game state and current game context, the processing of the hand-gestured message can be stopped so that the corresponding communication to the target player is not sent. For example, if the source player gives a hand-gestured message by twirling of their hand with a finger raised to alert the target player to the presence of an extraction helicopter that is about to take off, and the video game system knows that the target player is already moving toward the extraction helicopter, the video game system will stop the processing of the hand-gestured message by the source player and will not send the corresponding communication to the target player, lest the target player potentially get confused about there being more than one extraction helicopter. In some embodiments, the video game system operates to notify the source player when their gestured message is not sent to the target player for some reason. For example, the source player that hand-gestured about the extraction helicopter may be informed by the video game system that the target player is already on their way to the extraction helicopter. Also, in some embodiments, if it is determined or predicted by the video game system that delay in processing of the hand-gestured message is a problem, the video game system will automatically generate a summary or truncated communication to convey to the target player the intent of the original hand-gestured message as given by the source player. Also, in some embodiments, the video game system will automatically choose a format of the communication to the target player that is best for the target player within the current game state and game context. For example, a given hand-gestured message made by the source player can be conveyed to the target player in one or more of a textual format, an audible format, a graphical format, and a haptic format, among essentially any other possible communication format applicable to the video game being played.

FIG. 1A shows a diagram of a system 100 for supporting hand-gesture-based communication to a player of a video game, in accordance with some embodiments. The hand-gestured message is made by a source player 101 and is directed to a target player 103. In some embodiments, the source player 101 is equipped with one or more of an HMD 111, an external camera 113, a worn device 115, a control device 117, and a microphone 119. In some embodiments, one or more of the HMD 111, the external camera 113, the worn device 115, and the control device 117 are configured and operated to capture a video of a hand-gestured message made by the source player 101. The HMD 111 is configured to supply input data to a hand-gesture tracking engine 105, as indicated by arrow 112. In some embodiments, the input data provided by the HMD 111 is video data captured by one or more cameras mounted on the HMD 111, where the video data defines a video of the hand-gestured message made by the source player 101. The external camera 113 is configured to supply input data to the hand-gesture tracking engine 105, as indicated by arrow 114. In some embodiments, the input data provided by the external camera 113 is video data that defines a video of the hand-gestured message made by the source player 101. The worn device 115, e.g., glove, XR controller, etc., is configured to supply input data to the hand-gesture tracking engine 105, as indicated by arrow 116. In some embodiments, the input data provided by the worn device 115 is a detected position, orientation, and movement of one or more of a hand, a wrist, a set of fingers, and an arm of the source player 101 that is/are used to manipulate the worn device 115 to convey the hand-gestured message made by the source player 101. The control device 117 is configured to supply input data to the hand-gesture tracking engine 105, as indicated by arrow 118. In various embodiments, the control device 117 is any type of video game controller, as mentioned above, that is capable of generating signals that are indicative, at least in part, of the hand-gestured message made by the source player 101. Also, in some embodiments, the microphone 119 is configured and operated to capture an audio recording of the source player 101 that is associated with the hand-gestured message made by the source player 101, and convey the data that defines the audio recording to the hand-gesture tracking engine 105, as indicated by arrow 120.

The hand-gesture tracking engine 105 includes a first AI model component 105AI that is configured and trained to automatically identify the hand-gesture made by the source player 101 from the various input data received from the source player 101, e.g., various input data from one or more of the HMD 111, the external camera 113, the worn device 115, the control device 117, and the microphone 119. In some embodiments, the hand-gesture that is automatically identified by the hand-gesture tracking engine 105 is made by one or more of a hand, a finger, and an arm of the source player 101. In some embodiments, the hand-gesture tracking engine 105 is configured to analyze a sequence of video frames of a video of the source player 101, such as captured by the HMD 111 camera(s) and/or the external camera 113, to identify the hand-gesture within the sequence of video frames. Also, in some embodiments, the hand-gesture tracking engine 105 is configured to analyze a position and a movement of one or more sensors disposed on the source player 101, such as on the worn device 115 and/or control device 117. In some embodiments, the one or more sensors are disposed on a glove worn by the source player 101 or an XR controller held by the source player 101. It should be understood that the hand-gesture tracking engine 105 operates to continuously receive and process input data from the source player 101 during play of the video game to identify hand-gestures that are made by the source player 101 in substantially real-time. The hand-gesture tracking engine 105 is configured to convey the identification of the hand-gestures as determined by the first AI model component 105AI as input data to a hand-gesture intent engine 107, as indicated by arrow 106.

The hand-gesture intent engine 107 includes a second AI model component 107AI that is configured and trained to automatically determine a message for communication to the target player 103 as conveyed by the hand-gesture identified by the hand-gesture tracking engine 105. Also, in some embodiments, the second AI model component 107AI is configured and trained to automatically determine an identity of the target player. The second AI model component 107AI is configured to analyze game state data 131 of the video game and game context data 133 of the video game over a window of time immediately preceding a time of identification the hand-gesture by the hand-gesture tracking engine 105 to automatically determine a context of the video game related to one or both of the target player 103 and the source player 101.

Figure 1B:
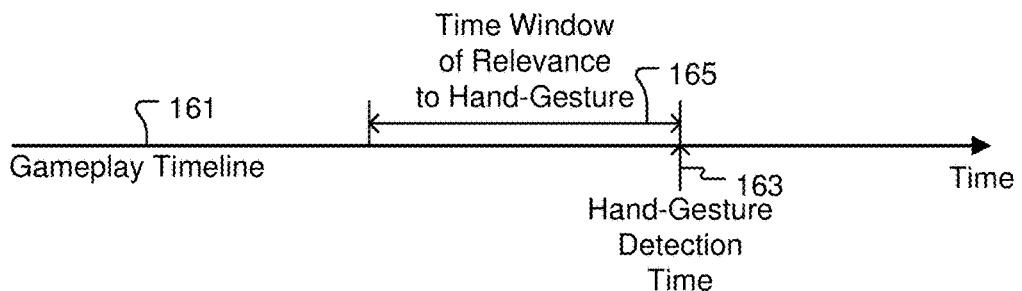
FIG. 1B shows a hand-gesture detection along a gameplay timeline, in accordance with some embodiments

For example, FIG. 1B shows a hand-gesture detection along a gameplay timeline 161, in accordance with some embodiments. The hand-gesture is detected by the hand-gesture tracking engine 105 at a hand-gesture detection time, as indicated by arrow 163. A time window of relevance to the hand-gesture 165 immediately precedes the hand-gesture detection time 163. The game state data 131 and the game context data 133 of the video game over the time window of relevance to the hand-gesture 165 is analyzed by the second AI model component 107AI to assist in automatically determining the message for communication to the target player 103 as conveyed by the hand-gesture identified by the hand-gesture tracking engine 105. In some embodiments, a duration of the time window of relevance to the hand-gesture 165 is set based on how rapidly changes occur in the game state data 131 and/or the game context data 133 of the video game. For example, in a fast-paced video game where actions and transitions occur quickly, the duration of the time window of relevance to the hand-gesture 165 is set to a small value on the order of a less than five seconds. In a slower-paced video game where actions and transitions occur more slowly, the duration of the time window of relevance to the hand-gesture 165 is set to a larger value on the order of a five or more seconds. In some embodiments, the duration of the time window of relevance to the hand-gesture 165 can be set by the source player 101 and/or the target player 103. In some embodiments, the duration of the time window of relevance to the hand-gesture 165 is set by a developer of the video game. In some embodiments, the duration of the time window of relevance to the hand-gesture 165 is user-controllable setting within the video game system.

The system 100 is configured to correlate the time at which hand-gestured communications are made to the game state data 131 and the game context data 133 at that time to facilitate proper interpretation of the hand-gestured communications. For example, a finger pointing to the sky could mean different things for different video game contexts, e.g., look an aircraft, look a bird, let's take off, etc. By temporally correlating the hand-gestured communications to the game state data 131 and the game context data 133 of the source player 101 and/or the target player 103, the system 100 is able to accurately interpret the meaning of the hand-gestured communications and convey the appropriate corresponding message to the target player 103.

In some embodiments, the second AI model component 107AI is configured to use the context of the video game related to one or both of the target player 103 and the source player 101 to determine which of a plurality of possible interpretations of the hand-gesture has a highest probability of being correct. Then, the message for communication to the target player 103 is the interpretation of the hand-gesture that has the highest probability of being correct. In some embodiments, the second AI model component 107AI is part of an "understanding layer" (which may be an add-on to the code of the video game) that assists with processing of hand-gestures by determining the contextual relevancy and/or meaning of the hand-gestures. Some hand-gestured communications have a spatial connotation within the context and scene of the video game. Some hand-gestured communications do not have a spatial connotation, but refer to some entity within the context and scene of the video game, where the entity may or may not be visible within the field of view of the source player 101, but is otherwise known by the source player 101 to exist in the context and scene of the video game.

In some embodiments, the second AI model component 107AI receives eye gaze detection data from the HMD 111 worn by the source player 101, as indicated by arrow 110. In these embodiments, the second AI model component 107AI processes the received eye gaze detection data of the source player 101 to assist with automatic determination of the message for communication to the target player 103. For example, if the eye gaze detection data indicates that the source player 101 is looking at a particular object within the scene of the video game as the source player 101 is making the hand-gesture, the second AI model component 107AI will determine a likelihood that the hand-gesture is related in some way to the particular object within the current scene of the video game. The eye gaze of the source player 101 is a precursor of the intent of the source player 101. Therefore, processing of the eye gaze detection data of the source player 101 by the AI model component 107AI of the hand-gesture intent engine 107 enables prediction of the intent of a forthcoming hand-gestured communication by the source player 101. This intent prediction capability allows the system 100 to ready itself to quickly make a prediction and confirmation of a forthcoming hand-gestured communication by the source player 101 and rapidly convey the communication to the target player 103, so as to achieve perceivably real-time processing and conveyance of hand-gestured communications between the source player 101 and the target player 103.

Also, in some embodiments, the second AI model component 107AI receives audio data from the microphone 119 of the source player 101, as indicated by arrow 136. In these embodiments, the second AI model component 107AI processes the received audio data of the source player 101 to assist with automatic determination of the message for communication to the target player 103. For example, in some embodiments, the second AI model component 107AI is configured and trained to detect keywords in the audio data and map those keywords to one or more objects within the current scene of the video game to assist with interpretation of the hand-gesture made by the source player 101. Once the message for communication to the target player 103 is determined and the identity of the target player 103 is determined, the hand-gesture intent engine 107 conveys the message and the identity of the target player 103 to a hand-gesture translation engine 109, as indicated by arrow 108.

The hand-gesture translation engine 109 includes a third AI model component 109AI that is configured and trained to automatically generate a communication to the target player 103 that conveys the message as determined by the hand-gesture intent engine 107. Also, the third AI model component 109AI is configured and trained to automatically control sending of the communication to the target player 103. The third AI model component 109AI is configured and trained to determine a format of the communication to the target player 103 that is most appropriate for the current game state data 131 and the current game context data 133 of the target player 103. In some embodiments, the format of the communication to the target player 103 is one or more of a textual format, an audible format, a graphical format, and a haptic format. The system 100 is also able to determine whether or not to convey the message corresponding to the hand-gestured communication to the target player 103 based on the current game state data 131 and the current game context data 133. In some embodiments, the third AI model component 109AI is configured and trained to block sending of the communication to the target player 103 that conveys the message as determined by the hand-gesture intent engine 107, when it is determined that the communication to the target player 103 is not relevant to the current game state data 131 and/or the current game context data 133 of the target player 103. In some embodiments, the third AI model component 109AI is configured and trained to accelerate sending of the communication to the target player 103 that conveys the message as determined by the hand-gesture intent engine 107, when it is determined that the communication to the target player 103 is urgent within the current game state data 131 and/or the current game context data 133 of the target player 103. In some embodiments, the third AI model component 109AI is configured and trained to accelerate sending of the communication to the target player 103 by modifying the message as determined by the hand-gesture intent engine 107, such as by shortening the message or by re-presenting the message in a more concise manner or by conveying the message in a symbolic/graphical manner that can be understood with just a glance by the target player 103. Therefore, it should be understood that the hand-gesture translation engine 109 operates to make decisions based on the current game state data 131 and the current game context data 133 for the following considerations: A) whether or not to convey the message as determined by the hand-gesture intent engine 107, B) whether or not to modify the message as determined by the hand-gesture intent engine 107, and C) whether or not to provide feedback to the source player 101 about how the message as determined by the hand-gesture intent engine 107 is being handled with regard to the ultimate communication of the message to the target player 103.

In some embodiments, the hand-gesture translation engine 109 determines from the current game state data 131 and the current game context data 133 of the target player 103 and the source player 101 that the target player 103 was either not looking at the source player 101 when the hand-gestured message was made by the source player 101, or the source player 101 was not in the field of view of the target player 103 when the hand-gestured message was made by the source player 101. In these embodiments, the hand-gesture translation engine 109 knows that the target player 103 is not aware of the hand-gestured message that was made by the source player 101. In these embodiments, the hand-gesture translation engine 109 operates to convert the message as determined by the hand-gesture intent engine 107 into a format that is suitable for the current status of the target player 103 in the video game and convey the message to the target player 103 even though the source player 101 is known to be unseen by the target player 103. Therefore, in these embodiments, the system 100 provides for hand-gesture-based communication from the source player 101 to the target player 103 that would otherwise not be possible.

Once the communication to the target player 103 that conveys the message as determined by the hand-gesture intent engine 107 is generated by the hand-gesture translation engine 109, the communication is conveyed to the target player 103. In some embodiments, the communication is conveyed, at least in part, to an HMD display 121 of the target player 103, as indicated by arrow 122. In some embodiments, the communication is conveyed, at least in part, to an HMD speaker 123 of the target player 103, as indicated by arrow 124. In some embodiments, the communication is conveyed, at least in part, to an external display 125 of the target player 103, as indicated by arrow 126. In some embodiments, the communication is conveyed, at least in part, to an external speaker 127 of the target player 103, as indicated by arrow 128. In some embodiments, the communication is conveyed, at least in part, to a haptic device 129 of the target player 103, as indicated by arrow 130. In some embodiments, the haptic device 129 is implemented within a video game controller of the target player 103. In some embodiments, the hand-gesture translation engine 109 operates to convey the same message in different ways to different target players 103.

Figure 2A:
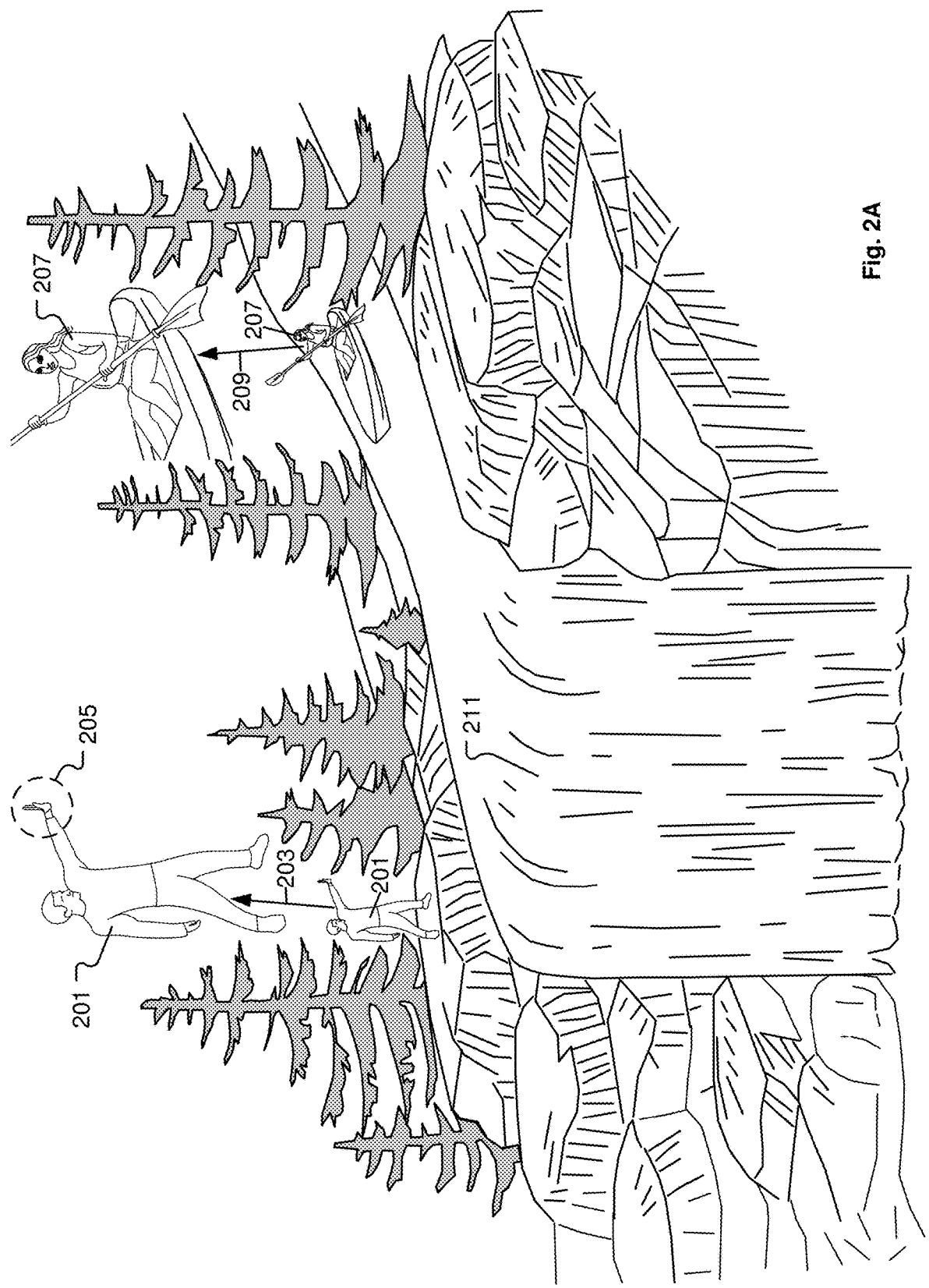
FIG. 2A shows an example video game scene that demonstrates operation of the system of FIG. 1A, in accordance with some embodiments.

FIG. 2A shows an example video game scene that demonstrates operation of the system 100 of FIG. 1A, in accordance with some embodiments. The video game scene includes an avatar of a first player 201 and an avatar of a second player 207. In this example, the first player 201 is the source player 101, and the second player 207 is the target player 103. The first player 201 is standing on a rock next to a river that is flowing over a waterfall 211. The second player 207 is in a boat rowing down the river toward the waterfall 211. The avatar of the first player 201 is enlarged and elevated to facilitate ease of description, as indicated by arrow 203. Similarly, the avatar of the second player 207 is enlarged and elevated to facilitate ease of description, as indicated by arrow 209. The first player 201 is making a hand-gesture 205 to convey a message to the second player 207 to stop so that they don't go over the waterfall 211.

Figure 2B:
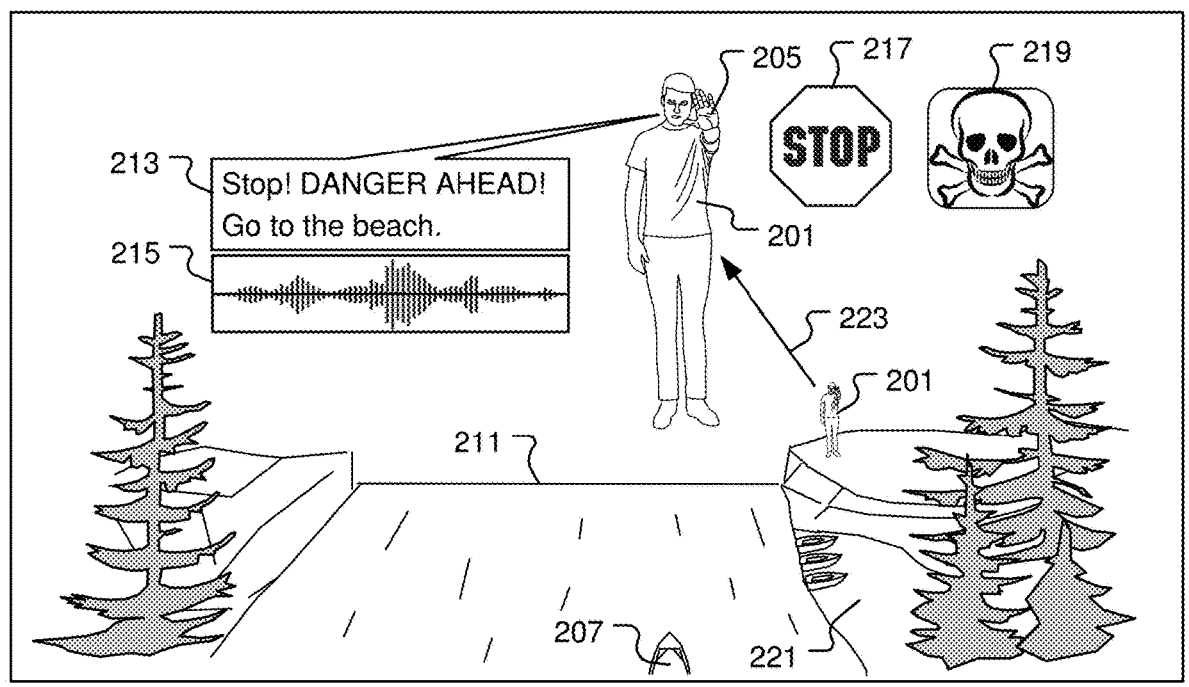
FIG. 2B is the same video game scene as shown in FIG. 2A, but from the perspective of the second player, in accordance with some embodiments.

FIG. 2B is the same video game scene as shown in FIG. 2A, but from the perspective of the second player 207, in accordance with some embodiments. The second player 207 is able to see the first player 201 up ahead standing on the rock on the right shore of the river. In some embodiments, when the hand-gesture tracking engine 105 determines that a hand-gesture has been made by the source player 101, the system 100 automatically highlights and/or or enlarges the hand-gesture made by the source player 101 so that it can be more easily seen by the target player 103. For example, FIG. 2B shows that the avatar of the first player 201 (the source player 101) is enlarged and displayed in a prominent location in the field of view of the second player 207 (the target player 103), as indicated by arrow 223, so that the second player 207 can more easily see and understand the hand-gesture 205 being made by the first player 201. The AI model component 105AI within the hand-gesture tracking engine 105 of the system 100 operates to automatically detect the hand-gesture 205 being made by the first player 201 in substantially real-time. In some embodiments, a video of the first player 201 is captured and analyzed by the AI model component 105AI to automatically identify the hand-gesture 205 being made by the first player 201. The hand-gesture tracking engine 105 notifies the hand-gesture intent engine 107 of the system 100 that the particular hand-gesture 205 has been made by the first player 201 (the source player 101).

The AI model component 107AI in the hand-gesture intent engine 107 of the system 100 operates to automatically determine the meaning of the particular hand-gesture 205 given the current game state data 131 and the current game context data 133. The AI model component 107AI also operates to automatically determine the identity of the target player 103 as the second player 207 given the current game state data 131 and the current game context data 133. In some embodiments, when the source player 101 makes a hand-gesture, the AI model component 105AI of the hand-gesture tracking engine 105 is able to identify the objective of the hand-gesture from the game state data 131 and the game context 133. The identified objective of the hand-gesture is then used by the AI model component 107AI of the hand-gesture intent engine 107 to interpret the meaning of the hand-gestured communication. In some embodiments, the objective of the hand-gesture may be indeterminate. In these embodiments, the system looks at other entities within the field of view of the target player 103 and/or the source layer 101 to determine which entity (or entities) most closely relate(s) to the hand-gestured communication. The AI model component 107AI of the hand-gesture intent engine 107 then interprets the hand-gestured communication with regard to the identified entity (or entities).

For example, the AI model component 107AI operates to automatically recognize that the waterfall 211 is an object in the video game scene that has relevance to both the second player 207 and the hand-gesture 205 made by the first player 201. The AI model component 107AI has learned from its training that the waterfall 211 is a danger that could lead to a player losing the video game, such that the waterfall 211 should be avoided. The AI model component 107AI has also learned from its training that the arm-out with hand-up gesture, e.g., hand-gesture 205, can mean stop and/or danger in some contexts. The AI model component 107AI has also learned from its training that many players choose to exit the river at the beach 221. Therefore, based on its collective training, the AI model component 107AI in the hand-gesture intent engine 107 automatically and in substantially real-time: 1) identifies the target player 103 of the hand-gesture 205 communication as the second player 207, and 2) determines that the message to be conveyed by the hand-gesture 205 communication is "Stop! Danger ahead! Go to the beach." The hand-gesture intent engine 107 notifies the hand-gesture translation engine 109 of the identity of the target player 103 (the second player 207 in the present example) and of the message to be conveyed to the target player 103 (to the second player 207) based on the hand-gesture 205 made by the source player 101 (the first player 201).

The AI model component 109AI of the hand-gesture translation engine 109 of the system 100 operates to automatically determine the most appropriate format to convey the message to the target player 103 (to the second player 207). In some embodiments, the AI model component 109AI determines that a textual communication 213 should be shown to the target player 201 (second player 207) to convey the message. In some embodiments, the AI model component 109AI determines that an audible communication 215 should be used to convey the message to the target player 201 (second player 207). In some embodiments, the audible communication 215 is a computer-generated natural language processing output of the message as determined by the hand-gesture translation engine 109, such as a computer-generated voice saying "Stop! Danger ahead! Go to the beach." Also, in some embodiments, the AI model component 109AI determines that a graphical form of communication should be used to convey the message to the target player 103 (second player 207). For example, FIG. 2B shows the AI model component 109AI determining that a stop sign 217 graphical image and a skull-and-crossbones 219 graphical image should be used to convey the message to the target player 103 (second player 207). It should be understood that for a given game state and game context (based on the current game state data 131 and the current game context data 133), the AI model component 109AI can determine that any one or more communication formats (e.g., textural, audible, graphical, haptic, etc.) should be used to convey the message to the target player 103 (the second player 207). It should be understood that the example of FIGS. 2A and 2B is provided to facilitate description of the various embodiments disclosed herein and should not be considered as imitating with regard to how the system 100 can be utilized in other scenarios to assist with hand-gestured communication within video games.

It should be understood that the system 100 understands the game context scenarios of each of the source player 101 and the target player 103. The system 100 also understands the field of views of each of the source player 101 and the target player 103 and what is shown in those field of views, e.g., non-player character(s), other team character(s), same team character(s), in-game objects, in-game assets, in-game environmental feature(s), among essentially any other object, asset, or feature that may be present within a video game scene. In some embodiments, there is an action item that is the focus of the source player 101 intent in making the hand-gestured communication. For example, in FIGS. 2A and 2B, preventing the second player 207 (target player 103) from going over the waterfall 211 is the action item that is the focus of the first player 201 (source player 101). The system 100 is configured to identify this focus of the source player 101 and use that focus information in processing the hand-gestured communication and conveying the corresponding communication to the target player 103. The system 100 is also able to determine whether or not the target player 103 has focus on the same action item or not with the video game scene. The system 100 determines how to most effectively convey the communication to the target player 103, depending on whether or not the target player 103 has focus on the same action item as the source player 101. The system 100 understands from the current game state data 131 and the current game context data 133 how much time the target player 103 has to receive and respond to a given hand-gestured communication made by the source player 101. Based on this understanding, the system 100 operates to convey the communication corresponding to the hand-gesture made by the source player 101 in a manner that is most appropriate to the time constraints of the target player 103. In some embodiments, for fast communication, the system 100 is configured to highlight (e.g., flash) one or more entities (e.g., in-game objects, avatars of players, in-game assets, in-game environmental features, etc.) within the field of view of the target player 103 to assist with rapid communication of the hand-gestured message made by the source player 101.

In some embodiments, the system 100 can be enabled and disabled by a player of the video game through a settings user interface. For some video games that are more heavily dependent upon hand-gestured communications during play of the video game, the system 100 can be used to assist less experienced players in the video game to understand more advanced and/or more rapid and/or more frequent hand-gestured communications, including those made by more advanced players of the video game. In this manner, the system 100 can be used to assist less-experienced players of a video game participate more effectively with experienced players of the video game so as to help reduce friction between players of the video game who have different levels of expertise in playing the video game. Therefore, in some embodiments, the system 100 is useful to help beginner players immerse themselves in a video game that is rich in hand-gesture-based communication. Also, in some embodiments, the system 100 is configured to determine a skill level of various players of the video game and throttle the amount of hand-gesture-based communication assistance that is provided to certain skill levels, so as not to interfere with and/or diminish the game play experience of the players. For example, advanced players of a video game may prefer to not have much or any assistance with making, recognizing, and/or interpreting hand-gestured messages during play of the video game. However, less experienced players of the video game do prefer to have some or much assistance with making, recognizing, and/or interpreting hand-gestured messages during play of the video game. Therefore, in these embodiments, the system 100 can independently control how much hand-gestured communication assistance is given to each player based on the skill level and/or preference settings of each player.

Figure 3:
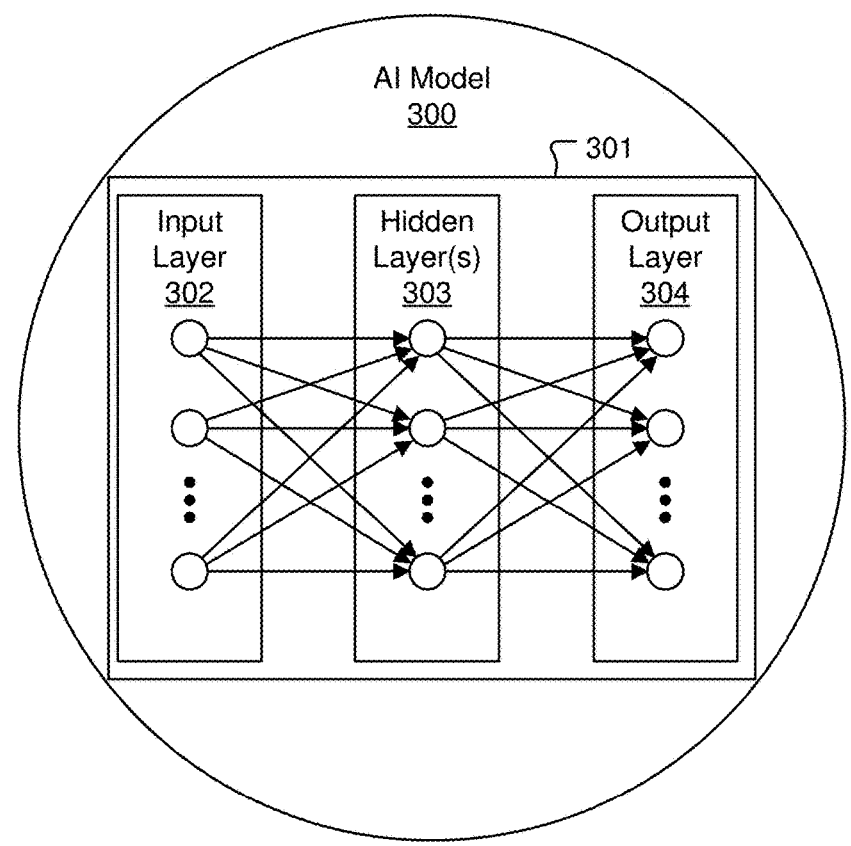
FIG. 3 shows an example AI model that implements a neural network, in accordance with some embodiments.

FIG. 3 shows an example AI model 300 that implements a neural network 301, in accordance with some embodiments. In some embodiments, the AI model 300 is representative of each of the AI model components in the system 100, including the first AI model component 105AI, the second AI model component 107AI, and the third AI model component 109AI. Given an input, the AI model 300 can analyze the input and provide an appropriate response to the input. For example, when the AI model 300 is trained as the first AI model component 105AI, the AI model 300 can be used to identify a hand-gesture that conveys a message within an image and/or video frame and/or series of video frames. Also, when the AI model 300 is trained as the second AI model component 107AI, the AI model 300 can be used to identify the target player 103 and determine the message being conveyed to the target player 103 by the hand-gestured communication that was detected by the first AI model component 105AI. Also, when the AI model 300 is trained as the third AI model component 109AI, the AI model 300 can be used to compose the communication to the target player 103 to convey the message as determined by the second AI model component 107AI in the most appropriate and efficient manner.

In some embodiments, the hand-gesture tracking engine 105 includes one or more modelers configured to build the first AI model component 105AI, as needed to learn about the hand-gesture identification process for a given game state and game context. In some embodiments, the hand-gesture intent engine 107 includes one or more modelers configured to build the second AI model component 107AI, as needed to learn about the hand-gestured message interpretation process for a given game state and game context. In some embodiments, the hand-gesture translation engine 109 includes a modeler configured to build the third AI model component 109AI, as needed to learn about the communication composition process for a given game state and game context. In various embodiments, the system 100 utilizes AI, including deep learning algorithms, reinforcement learning, and/or other AI-based algorithms to build and train the first AI model component 105AI, the second AI model component 107AI, and the third AI model component 109AI. In some embodiments, reinforcement learning with some specified goal, e.g., make someone a better player, make the video game run smoother, make the game players react faster, etc., is used to train one or more of the first AI model component 105AI, the second AI model component 107AI, and the third AI model component 109AI. Also, in some embodiments, the system 100 is configured to use updated training data to continually refine the training of one or more of the first AI model component 105AI, the second AI model component 107AI, and the third AI model component 109AI.

In various embodiments, the neural network 301 can be implemented as a deep neural network, a convolutional deep neural network, and/or a recurrent neural network using supervised or unsupervised training. In some embodiments, the neural network 301 includes a deep learning network that supports reinforcement learning, or rewards based learning (e.g., through the use of success criteria, success metrics, etc.). For example, in some embodiments, the neural network 301 is set up as a Markov decision process (MDP) that supports a reinforcement learning algorithm. The neural network 301 represents a network of interconnected nodes, such as an artificial neural network. In FIG. 3, each circle represents a node. Each node learns some information from the training data. Knowledge can be exchanged between the nodes through the interconnections. In FIG. 3, each arrow between nodes represents an interconnection. Input to the neural network 301 activates a set of nodes. In turn, this set of nodes activates other nodes, thereby propagating knowledge about the input. This activation process is repeated across other nodes until an output is provided. The example neural network 301 includes a hierarchy of nodes. At the lowest hierarchy level, an input layer 302 exists. The input layer 302 includes a set of input nodes. In some embodiments, intermediary predictions of the AI model 300 are determined through a classifier that creates labels, such as outputs, features, nodes, classifications, etc. At the highest hierarchical level, an output layer 304 exists. The output layer 304 includes a set of output nodes. Each output node represents a possible output of the AI model 300 for a given set of inputs provided to the AI model 300. In various embodiments, the results generated by the AI model 300 can be compared to pre-determined and true results, or learned changes and results, in order to refine and/or modify the parameters used by the system 100 to iteratively determine the appropriate predicted or expected responses and/or changes for a given set of inputs. The nodes in the neural network 301 learn the parameters of the trained AI model 300 that can be used to make such decisions when refining the parameters.

In some embodiments, one or more hidden layer(s) 303 exists within the neural network 301 between the input layer 302 and the output layer 304. The hidden layer(s) 303 includes "X" number of hidden layers, where "X" is an integer greater than or equal to one. Each of the hidden layer(s) 303 includes a set of hidden nodes. The input nodes of the input layer 302 are interconnected to the hidden nodes of first hidden layer 303. The hidden nodes of the last ("$X^{th}$") hidden layer 303 are interconnected to the output nodes of the output layer 304, such that the input nodes are not directly interconnected to the output nodes. If multiple hidden layers 303 exist, the input nodes of the input layer 302 are interconnected to the hidden nodes of the lowest (first) hidden layer 303. In turn, the hidden nodes of the first hidden layer 303 are interconnected to the hidden nodes of the next hidden layer 303, and so on, until the hidden nodes of the highest ("$X^{th}$") hidden layer 303 are interconnected to the output nodes of the output layer 304.

An interconnection connects two nodes in the neural network 301. The interconnections in the example neural network 301 are depicted by arrows. Each interconnection has a numerical weight that can be learned, rendering the neural network 301 adaptive to inputs and capable of learning. Generally, the hidden layer(s) 303 allow knowledge about the input nodes of the input layer 302 to be shared among all the tasks corresponding to the output nodes of the output layer 304. In this regard, in some embodiments, a transformation function $f$ is applied to the input nodes of the input layer 302 through the hidden layer(s) 303. In some cases, the transformation function $f$ is non-linear. Also, different non-linear transformation functions $f$ are available including, for instance, a rectifier function $f(x)=\max(0,x)$.

In some embodiments, the neural network 301 also uses a cost function c to find an optimal solution. The cost function c measures the deviation between the prediction that is output by the neural network 301 defined as $f(x)$, for a given input x and the ground truth or target value y (e.g., the expected result). The optimal solution represents a situation where no solution has a cost lower than the cost of the optimal solution. An example of a cost function c is the mean squared error between the prediction and the ground truth, for data where such ground truth labels are available. During the learning process, the neural network 301 can use back-propagation algorithms to employ different optimization methods to learn model parameters (e.g., learn the weights for the interconnections between nodes in the hidden layer(s) 303) that minimize the cost function c. An example of such an optimization method is stochastic gradient descent.

Figure 4:
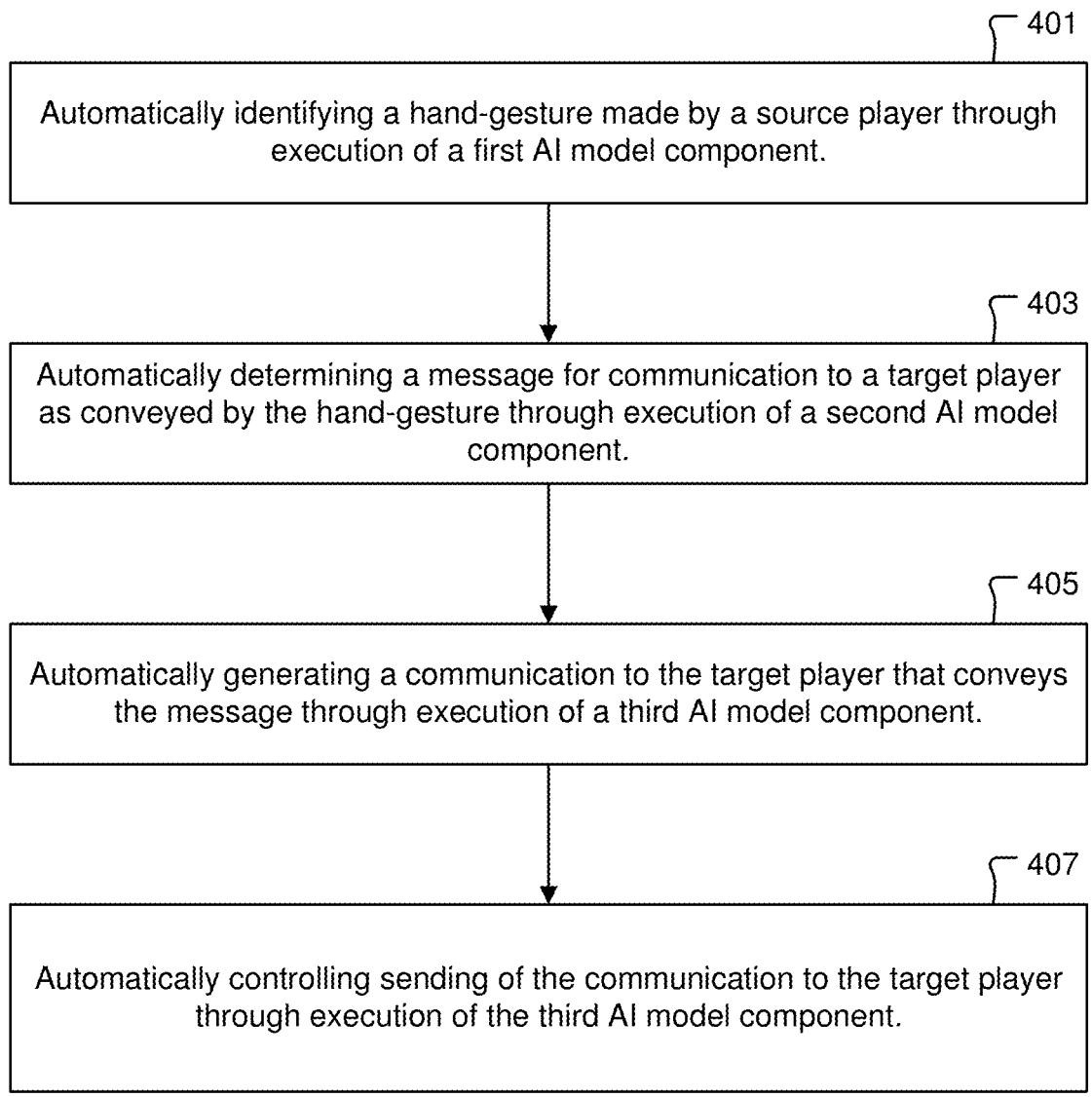
FIG. 4 shows a flowchart of a method for supporting hand-gesture-based communication to a player of a video game, in accordance with some embodiments.

FIG. 4 shows a flowchart of a method for supporting hand-gesture-based communication to a player of a video game, in accordance with some embodiments. The method includes an operation 401 for automatically identifying a hand-gesture made by the source player 101 through execution of the first AI model component 105AI. In some embodiments, the hand-gesture is made by one or more of a hand, a finger, and an arm of the source player 101. In some embodiments, the first AI model component 105AI is executed to analyze a sequence of video frames of a video of the source player 101 to identify the hand-gesture within the sequence of video frames. In some embodiments, the first AI model component 105AI is executed to analyze a position and a movement of one or more sensors disposed on the source player 101. In some embodiments, the one or more sensors are disposed on a glove worn by the source player 101 or an XR controller held by the source player 101.

The method also includes an operation 403 for automatically determining a message for communication to the target player 103 as conveyed by the hand-gesture through execution of the second AI model component 107AI. In some embodiments, the second AI model component 107AI is executed to automatically determine an identity of the target player 103 based on the message as determined by the second AI model component 107AI. In some embodiments, the second AI model component 107AI is executed to analyze the game state data 131 of the video game and game context data 133 of the video game over a window of time 165 immediately preceding a time of identification the hand-gesture 163 by the first AI model component 105AI to automatically determine a context of the video game related to one or both of the target player 103 and the source player 101. In some embodiments, the second AI model component 107AI is executed to use the context of the video game related to one or both of the target player 103 and the source player 101 to determine which of a plurality of possible interpretations of the hand-gesture has a highest probability of being correct, where the message for communication to the target player 103 is the interpretation of the hand-gesture having the highest probability of being correct. In some embodiments, the second AI model component 107AI is executed to process eye gaze detection data of the source player 101 to assist with automatic determination of the message for communication to the target player 103.

The method also includes an operation 405 for automatically generating a communication to the target player 103 that conveys the message through execution of the third AI model component 109AI. The method also includes an operation 407 for automatically controlling sending of the communication to the target player 103 through execution of the third AI model component 109AI. In some embodiments, the third AI model component 109AI is executed to determine a format of the communication to the target player 103 that is most appropriate for a current game state and a current game context of the target player 103, where the format of the communication to the target player 103 is one or more of a textual format, an audible format, a graphical format, and a haptic format. In some embodiments, the third AI model component 109AI is executed to block sending of the communication to the target player 103 when it is determined that the communication to the target player 103 is not relevant to a current game state and a current game context of the target player 103. In some embodiments, the third AI model component 109AI is executed to accelerate sending of the communication to the target player 103 when it is determined that the communication to the target player 103 is urgent within a current game state or a current game context of the target player 103. In some embodiments, the third AI model component 109AI is executed to accelerate sending of the communication to the target player 103 by modifying the message as determined by the second AI model component 107AI.

Figure 5:
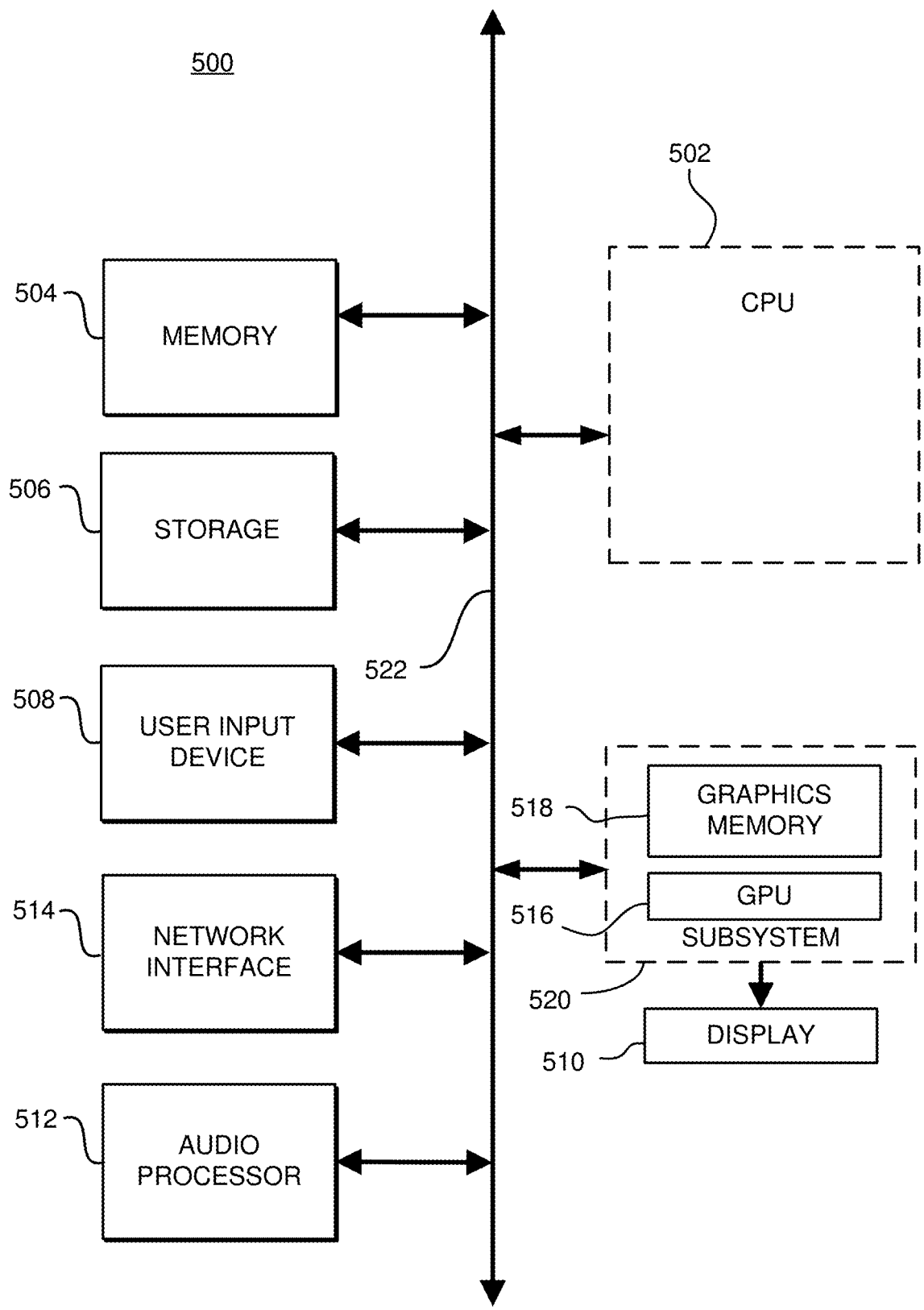
FIG. 5 shows various components of an example server device within a cloud-based computing system that can be used to perform aspects of the system and method for AI-assisted communication within the video game, in accordance with some embodiments.

FIG. 5 shows various components of an example server device 500 within a cloud-based computing system that can be used to perform aspects of the system 100 and method for AI-assisted communication within the video game, in accordance with some embodiments. This block diagram illustrates the server device 500 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 500 includes a central processing unit (CPU) 502 for running software applications and optionally an operating system. The CPU 502 may be comprised of one or more homogeneous or heterogeneous processing cores. For example, the CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be localized to a player playing a game segment (e.g., game console), or remote from the player (e.g., back-end server processor), or one of many servers using virtualization in the cloud-based gaming system 500 for remote streaming of game play to client devices.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 514, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. In addition to display device 510, the pixel data can be projected onto a projection surface. Device 500 can provide the display device 510 with an analog or digital signal, for example.

Implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A computer-implemented method comprising:
automatically identifying a hand-gesture made by a source player in a video game, through execution of a first artificial intelligence model component;
automatically determining a message intent for a communication to a target player as conveyed by the hand-gesture, through execution of a second artificial intelligence model component;
after automatically determining the message intent, automatically (i) determining a timing for sending the communication to the target player based on game state data that is temporally correlated to the source player making the hand-gesture, and (ii) generating the communication to the target player that conveys the message intent, through execution of a third artificial intelligence model component; and
automatically controlling sending of the communication to the target player according to the determined timing, through execution of the third artificial intelligence model component.

2. The method of claim 1, wherein determining the timing for the communication comprises determining to block sending the communication.

3. The method of claim 1, wherein determining the timing for the communication comprises determining to immediately send the communication.

4. The method of claim 1, wherein the timing for sending the communication is determined based on game state data that indicates that the communication is not relevant to a current game state of the video game.

5. The method of claim 1, wherein the timing for sending the communication is determined based on game state data that indicates that the target player is looking at the source player in the video game.

6. The method of claim 1, wherein the timing for sending the communication is determined based on game state data that indicates that the source player is not within a field of view of the target player in the video game.

7. The method of claim 1, wherein the communication to the target player comprises an enlarged representation of the hand-gesture in the video game.

8. The method of claim 1, wherein the communication to the target player comprises a highlighted representation of the hand-gesture in the video game.

9. The method of claim 1, comprising determining an identify of the target player based at least on the hand-gesture.

10. The method of claim 1, wherein the message intent is automatically determined based on game state data of other players who have previously played the video game.

11. A system comprising:
one or more computer processors; and
one or more non-transitory computer-readable media that store instructions which, when executed by the one or more computer processors, cause the one or more computer processors to perform operations comprising:
automatically identifying a hand-gesture made by a source player in a video game, through execution of a first artificial intelligence model component;
automatically determining a message intent for a communication to a target player as conveyed by the hand-gesture, through execution of a second artificial intelligence model component;
after automatically determining the message intent, automatically (i) determining a timing for sending the communication to the target player based on game state data that is temporally correlated to the source player making the hand-gesture, and (ii) generating the communication to the target player that conveys the message intent, through execution of a third artificial intelligence model component; and
automatically controlling sending of the communication to the target player according to the determined timing, through execution of the third artificial intelligence model component.

12. The system of claim 11, wherein determining the timing for the communication comprises determining to block sending the communication.

13. The system of claim 11, wherein determining the timing for the communication comprises determining to immediately send the communication.

14. The system of claim 11, wherein the timing for sending the communication is determined based on game state data that indicates that the communication is not relevant to a current game state of the video game.

15. The system of claim 11, wherein the timing for sending the communication is determined based on game state data that indicates that the target player is looking at the source player in the video game.

16. The system of claim 11, wherein the timing for sending the communication is determined based on game state data that indicates that the source player is not within a field of view of the target player in the video game.

17. The system of claim 11, wherein the communication to the target player comprises an enlarged representation of the hand-gesture in the video game.

18. The system of claim 11, wherein the communication to the target player comprises a highlighted representation of the hand-gesture in the video game.

19. The system of claim 11, comprising determining an identify of the target player based at least on the hand-gesture.

20. The system of claim 11, wherein the message intent is automatically determined based on game state data of other players who have previously played the video game.

21. One or more non-transitory computer-readable media that store instructions which, when executed by the one or more computer processors, cause the one or more computer processors to perform operations comprising:
automatically identifying a hand-gesture made by a source player in a video game, through execution of a first artificial intelligence model component;
automatically determining a message intent for a communication to a target player as conveyed by the hand-gesture, through execution of a second artificial intelligence model component;
after automatically determining the message intent, automatically (i) determining a timing for sending the communication to the target player based on game state data that is temporally correlated to the source player making the hand-gesture, and (ii) generating the communication to the target player that conveys the message intent, through execution of a third artificial intelligence model component; and automatically controlling sending of the communication to the target player according to the determined timing, through execution of the third artificial intelligence model component.

22. The media of claim 21, wherein determining the timing for the communication comprises determining to block sending the communication.

23. The media of claim 21, wherein determining the timing for the communication comprises determining to immediately send the communication.

24. The media of claim 21, wherein the timing for sending the communication is determined based on game state data that indicates that the communication is not relevant to a current game state of the video game.

25. The media of claim 21, wherein the timing for sending the communication is determined based on game state data that indicates that the target player is looking at the source player in the video game.

26. The media of claim 21, wherein the timing for sending the communication is determined based on game state data that indicates that the source player is not within a field of view of the target player in the video game.

27. The media of claim 21, wherein the communication to the target player comprises an enlarged representation of the hand-gesture in the video game.

28. The media of claim 21, wherein the communication to the target player comprises a highlighted representation of the hand-gesture in the video game.

29. The media of claim 21, comprising determining an identify of the target player based at least on the hand-gesture.

30. The media of claim 21, wherein the message intent is automatically determined based on game state data of other players who have previously played the video game.

* * * * *